(12) United States Patent
Bove et al.

(10) Patent No.: US 10,759,322 B2
(45) Date of Patent: Sep. 1, 2020

(54) MOTORIZED VEHICLE WITH ELEVATING CABIN FOR TRANSPORTATION OF PEOPLE OR GOODS

(71) Applicant: BAUMANN S.R.L., Cavaion Veronese (IT)

(72) Inventors: Riccardo Bove, Cavaion Veronese (IT); Klaus Pirpamer, Cavaion Veronese (IT)

(73) Assignee: BAUMANN S.R.L., Cavaion Veronese (IT)

( * ) Notice: Subject to any disclaimer, the term of this patent is extended or adjusted under 35 U.S.C. 154(b) by 68 days.

(21) Appl. No.: 16/093,650

(22) PCT Filed: Apr. 27, 2017

(86) PCT No.: PCT/IB2017/052429
§ 371 (c)(1),
(2) Date: Oct. 15, 2018

(87) PCT Pub. No.: WO2017/187374
PCT Pub. Date: Nov. 2, 2017

(65) Prior Publication Data
US 2019/0070993 A1    Mar. 7, 2019

(30) Foreign Application Priority Data

Apr. 28, 2016    (EP) ..................................... 16167417

(51) Int. Cl.
*B60P 1/02*    (2006.01)
*B62D 47/02*    (2006.01)
(Continued)

(52) U.S. Cl.
CPC ............ *B60P 1/02* (2013.01); *B62D 33/0636* (2013.01); *B62D 47/02* (2013.01); *B64F 1/31* (2013.01)

(58) Field of Classification Search
CPC ....... B60P 1/02; B62D 33/0636; B62D 47/02; B64F 1/31
See application file for complete search history.

(56) References Cited

U.S. PATENT DOCUMENTS 3,524,563 A * 8/1970 McCartney ............ B65G 67/00
                                                              414/471
3,606,250 A * 9/1971 Sherman ................... B60S 9/12
                                                              254/423

(Continued)

FOREIGN PATENT DOCUMENTS

| DE | 20 2004 008238 U1 | 8/2004 |
| GB | 924 971 A | 5/1963 |
| WO | 00/55041 A1 | 9/2000 |

OTHER PUBLICATIONS

European Patent Office, NL; dated Jul. 24, 2017.

*Primary Examiner* — Drew J Brown
(74) *Attorney, Agent, or Firm* — Patshegen IP LLC; Moshe Pinchas

(57) ABSTRACT

A motorized vehicle (V) for transportation of people or goods generally comprising frame means (T) for supporting a housing cabin (C) for the said people or goods and suitable to be elevated by means of lifting means (S, M) of the said cabin (C) for moving the said cabin (C) between a loading/unloading position (PT) of said people at ground level and a loading/unloading position (PEA) of said people at an elevated level; the said lifting means (S, M) comprise column means (M) defined by cylindrical movement means (7) inserted into each other and suitable to slide through dynamic actuating means (8, 9) arranged coupled to the said movement means (7); said column means (M) supporting wheel means (12) for moving the said vehicle and suspension means (13) connected to the said wheel means (12).

8 Claims, 4 Drawing Sheets

Figure 1:
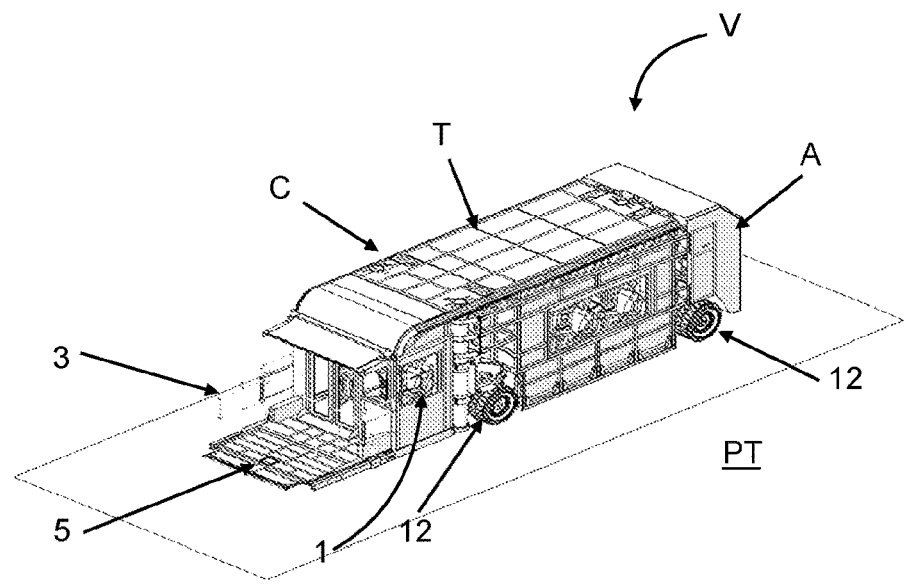

(51) Int. Cl.
*B64F 1/31* (2006.01)
*B62D 33/063* (2006.01)

(56) References Cited

U.S. PATENT DOCUMENTS

| | | | | |
|---|---|---|---|---|
| 2006/0000951 | A1* | 1/2006 | Hennig | B64F 1/31 244/137.1 |
| 2014/0202792 | A1* | 7/2014 | Stoneburner, Jr. | B66F 11/04 182/69.4 |
| 2019/0047481 | A1* | 2/2019 | Eppright | B62D 33/0608 |

* cited by examiner

MOTORIZED VEHICLE WITH ELEVATING CABIN FOR TRANSPORTATION OF PEOPLE OR GOODS

The present invention relates to a motorized vehicle with elevating cabin for the transportation of people, luggage, goods or loads in general.

The invention is advantageously used in airports or similar infrastructures, the description of which will make explicit reference without for this reason losing generality, during the collective transport of people, in particular for people, people with reduced or prevented mobility or with disabilities (PRM person with reduced mobility), people with priority access or technical security staff, or for carrying luggage or loads in general.

Generally, in the field of passenger transport vehicles at airports, it is widely known the use of motorized vehicles generally called the ambulift, which are equipped with cabins wherein people are accommodated, the cabins being supported by systems suitable to elevate the cabins themselves, from a loading position of people at ground level to an unloading position of people inside the aircraft, and vice versa. Currently, a first known type includes a commercial vehicle suitably provided for the specific requirement with the adoption of a pantograph or the like designed for the elevation of a cabin for passenger transportation: generally, it is a vehicle equipped with stabilizers, to be activated during the unloading step of passengers to the aircraft. The loading/unloading step carried out by such a vehicle during the transportation of a disabled person sitting on his own wheelchair can be summarized in the following steps:

a) Approach of the vehicle to the airport gate.
b) Arrangement of the access platform on the ground.
c) Loading of one or two wheelchairs with the disabled person.
d) Elevation of the platform.
e) Transportation of the disabled person inside the cabin with the help of the staff.
f) Accommodation and securing of the disabled person by means of appropriate seat belts inside the cabin.
g) Subsequent lowering of the platform to load another disabled person and repetition of the above-mentioned steps.
h) Once completed the loading step, the cabin proceeds towards the aircraft.
i) Stop at destination, vehicle stabilization.
j) Elevation of the entire cabin through servo-hydraulic mechanisms, until reaching the level of the aircraft access.
k) Unloading of all the staff.
l) Descent of the cabin, return of the stabilizing feet and subsequent departure from the aircraft.

Therefore, a so structured known vehicle only allows the loading of one or two disabled people on a wheelchair at a time, since it is impossible to load additional wheelchairs until said platform is not repositioned on the ground. In addition, said stabilizers must be activated before the complete lifting of the cabin: if the position of the vehicle is incorrect, the operator must lower the cabin again, retract the stabilizers, replace the vehicle, and finally lift the cabin again. It is therefore evident that the use of such a known vehicle entails considerable disadvantages, especially in terms of excessive loading/unloading time.

Another known type includes a vehicle of the side-loader forklift type, that is a vehicle wherein the passenger cabin is arranged supported between two fork elements suitable to allow the lifting of the cabin itself and there is an upright or lifting unit of different modes (free duplex, triplex or large lift) according to the specific requirements. Even if this type of vehicle solves some problems of the above-mentioned pantograph solution, that is the possibility of carrying the cabin to the ground avoiding the repetition of the above-analysed steps b), c) and d), thus greatly reducing loading/unloading times, it presents considerable disadvantages, such as the rigidity of the vehicle as a whole and, therefore, its poor comfort, and very slow movement speed due to its inherent asymmetry in its weight distribution in the transverse direction to the driving directions. In addition, this kind of vehicle has the lifted cabin as if it were a cantilevered load; it is therefore subject to not negligible bending and is highly susceptible to breaks, and, because of the aforementioned asymmetric weighing distribution, it occupies considerable space (not all airports have such a large space available).

Other solutions are also known, such as a passenger cabin which has to be leaned sideways to the base carriage, with a considerable dimension, and where the lateral movement of the cabin, the chain maintenance, the oscillations of the cabin at high heights caused by the flexibility of the upright or lifting unit constitute major disadvantages.

Thus, the object of the present invention is to overcome the drawbacks and issues of the above-mentioned known art.

In particular, an object of the present invention is to provide a motorized vehicle for transportation of people or goods which allows very fast and easy loading/unloading operations.

Another object of the present invention is to provide a motorized vehicle for transportation of people or goods which is very comfortable and provided with an optimum movement speed, suitable to the needs of airports or similar infrastructures.

Figure 2:
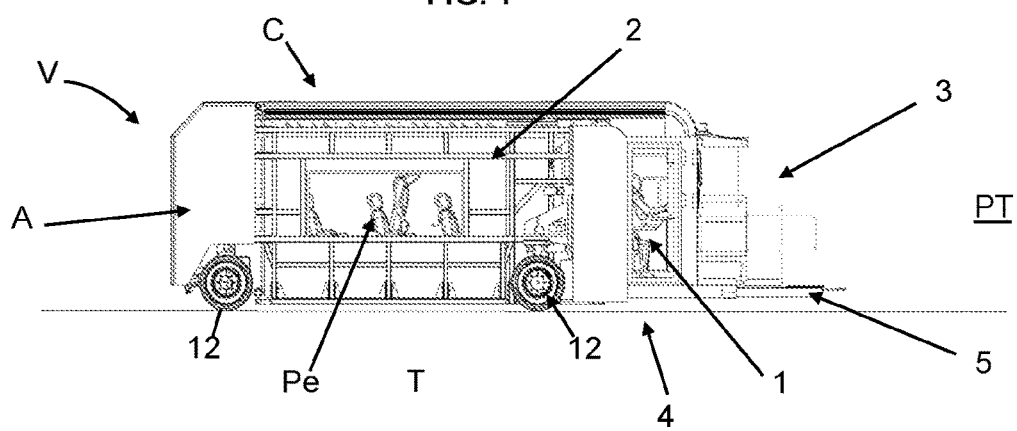
Figure 3:
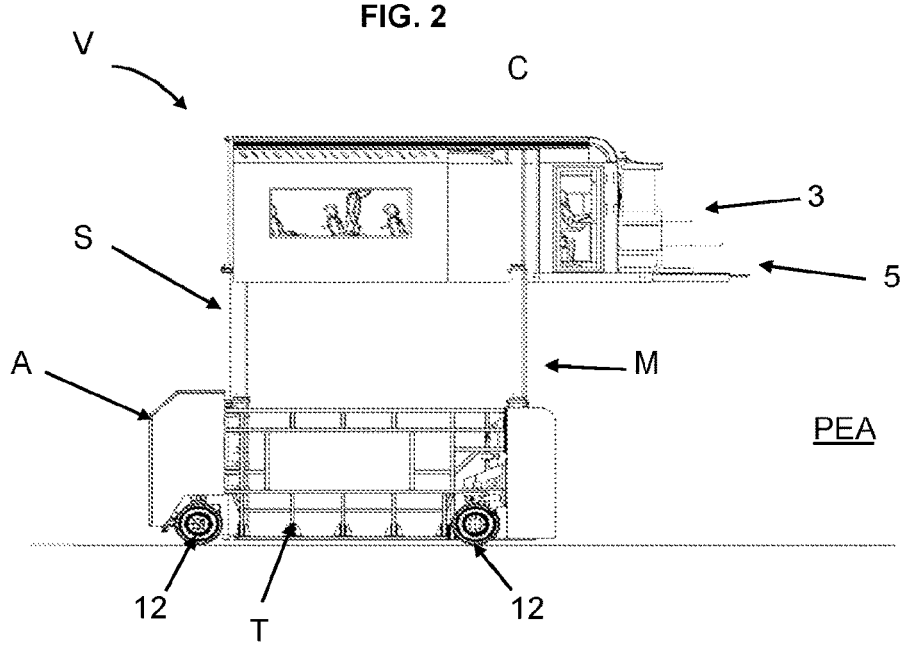
Figure 4:
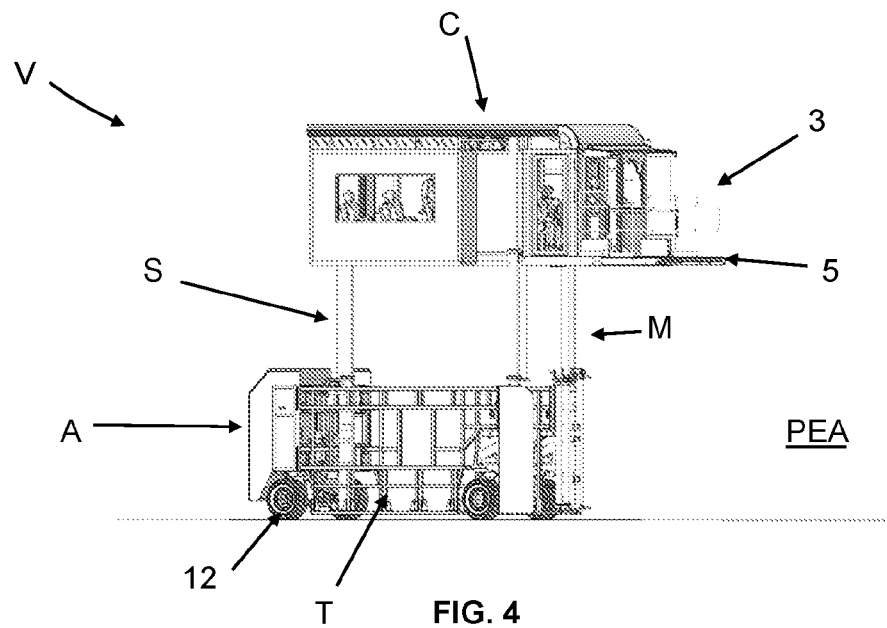
Figure 5:
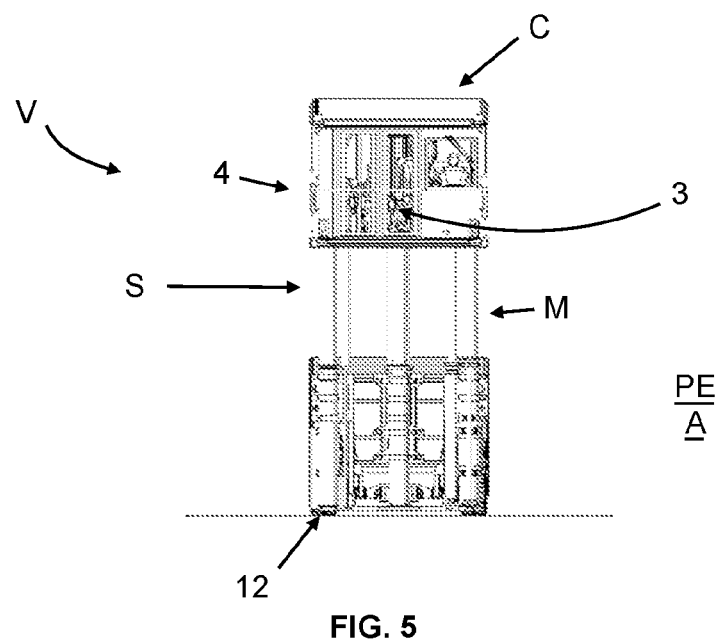
Figure 6:
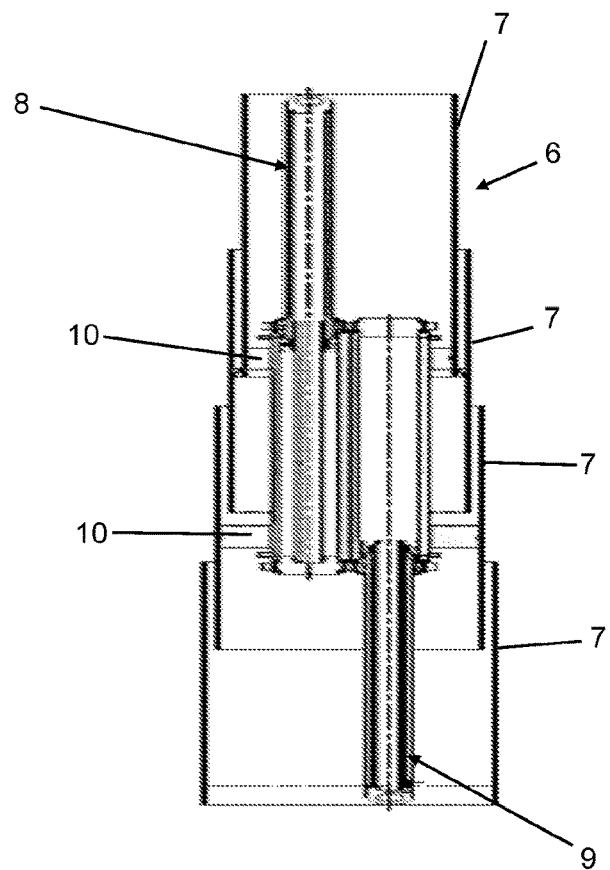
Figure 7:
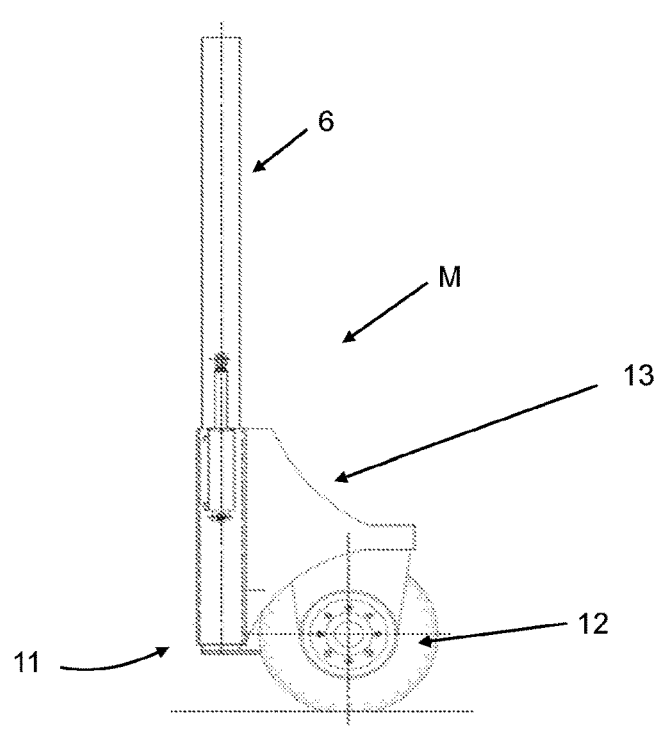
Figure 8:
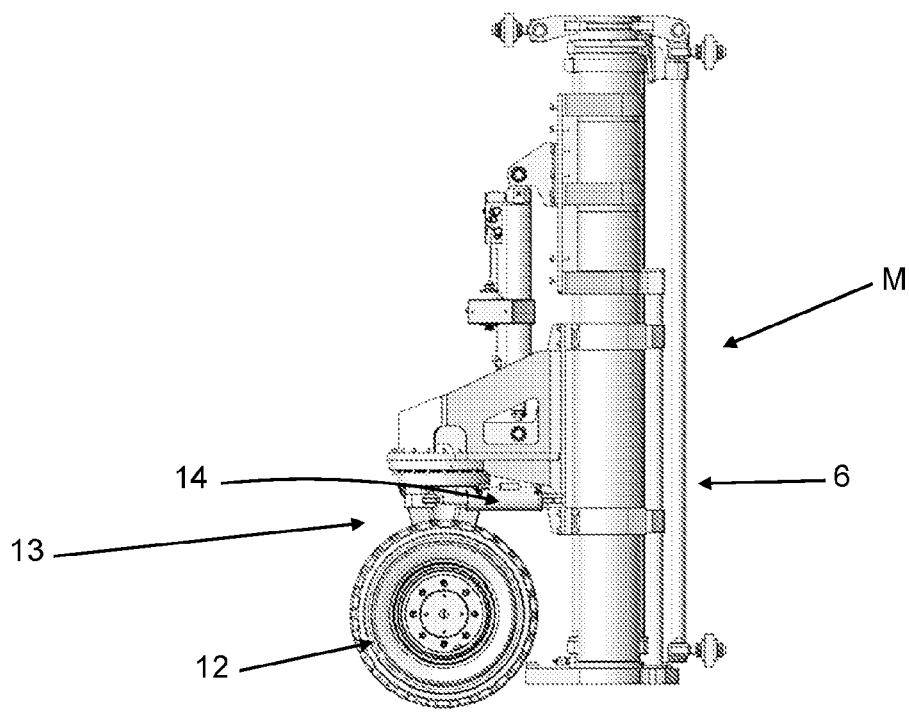
Figure 9:
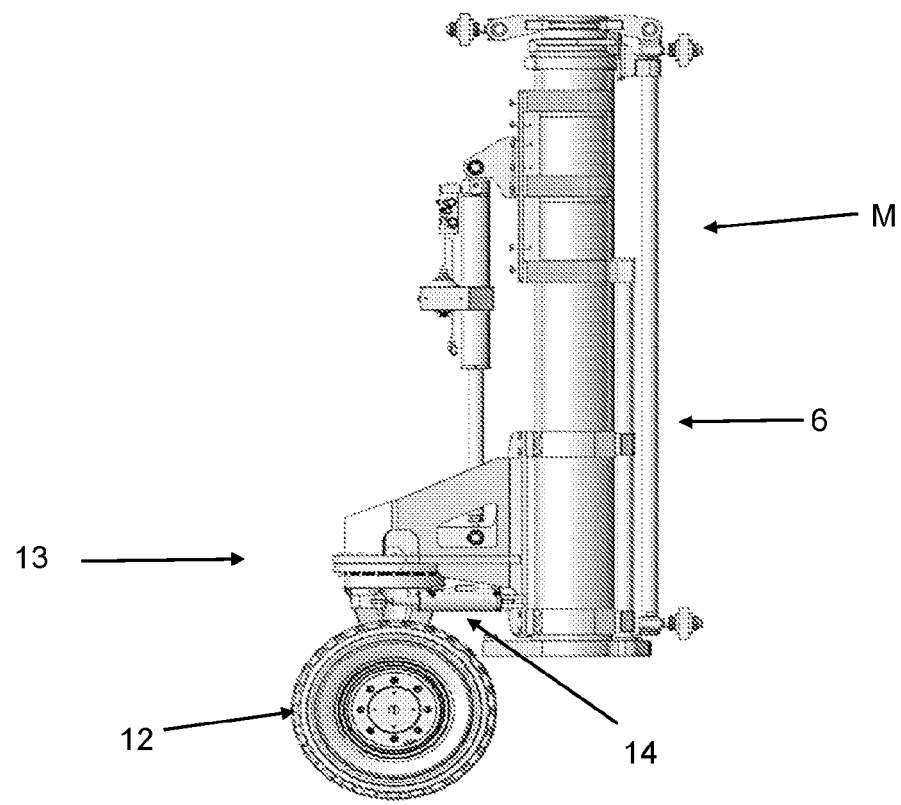

An additional object of the present invention is to provide a motorized vehicle for transportation of people or goods which is competitive in terms of production costs. The structural and functional features of the present invention and its advantages over the known art will be clearer and more evident from the analysis of the claims below, and in particular from an examination of the following description, made with reference to the attached drawings showing a preferred but non-limiting embodiment of the present transportation vehicle, wherein:

FIG. 1 is a perspective view of the present vehicle;
FIG. 2 is a side view of the vehicle of FIG. 1 in a first operating position;
FIG. 3 is a side view of the vehicle of FIG. 1 in a second operating position;
FIG. 4 shows a perspective view of the vehicle of FIG. 3;
FIG. 5 is a front view of the vehicle of FIG. 3;
FIG. 6 shows an enlarged sectional view and with removed parts for clarity, a detail of the lifting cylinders of the present vehicle;
FIG. 7 shows an enlarged and simplified view and with removed parts for clarity, a lifting column integrating the detail of FIG. 6;
FIG. 8 shows an enlarged side view of the component of FIG. 7 in its variant and a first operating position; and
FIG. 9 shows an enlarged side view of the component of FIG. 8 in a second operating position;

With reference to FIGS. 1 to 5, V is generally referred to as a motorized vehicle used in the airports or similar infrastructures for the collective transportation of people, in particular for people with reduced or prevented mobility or with disabilities, people with priority access or technical security staff, or for the transportation of luggage or loads in general.

The vehicle V includes an engine compartment A housing an electric engine or an internal combustion engine and/or a hybrid engine, a frame T of metal tubes type suitable to support, in a supporting manner and substantially enclosed therein, a closed cabin C (load cell) wherein people (generally indicated with Pe) are accommodated in order to be transported inside the airport area.

The cabin C includes therein a driving seat 1 on the front of the vehicle V, a main area 2 for the accommodation and standing of people with annexed attachment means (known and not illustrated) of the wheelchairs for disabled people, some seats for the supporting staff and/or family members of the disabled people, or other means for transportation of various materials, a door 3 for the access of people inside the cabin C and for the exit towards the outside of the cabin C itself, and an emergency exit door 4.

The door 3 is provided with platform means 5 (fixed, retractable and/or tilting) allowing the entrance/exit with easy access of the wheelchairs on which disabled people Pe are seated.

The cabin C, which can be elevated from downside, is supported by a column system S with lifting uprights M suitable to perform the elevation of the cabin C itself in the frame T from a loading/unloading position PT of people at ground level (FIGS. 1 and 2) to an unloading/loading position PEA of people at the elevated level of the aircraft doors (FIGS. 3 and 4).

As better illustrated in FIGS. 3, 4 and 5, the system S of lifting columns M is formed by at least three upright columns M, preferably two columns arranged fixed and acting at the opposite sides of the front of the vehicle V and one column arranged fixed and acting in the centre of the rear of the vehicle V.

According to what specifically illustrated in FIG. 6, each lifting column M comprises a series 6 of cylinders (or extensions) 7 (four of which illustrated in FIG. 6) inserted into each other and suitable to slide through two internal hydraulic lubricated actuators 8 and 9 inside the cylinders 7, suitably dimensioned and of the double barrel or stem type, driven by sliding skids 10.

This adopted solution is very advantageous as it allows for free inflection values, which are significantly lower than those of the traditional telescopic cylinder, thereby reducing the total dimensions of the stem section and cylinder sleeve itself.

According to the variant shown in FIGS. 8 and 9, said hydraulic lubricated actuators are arranged fixed outside the cylinders 7 and acting outside the cylinders 7 themselves.

As illustrated in FIGS. 7 to 9, a wheel 12 with a steering (idle and/or drive) axle for moving the vehicle V through the interposition of suspension means 13 is fixed at the lower end 11 of each column M.

The suspension means 13 include the hydraulic lubricated cylinders 14 advantageously suitable to allow the passenger cabin C to be lowered to the ground level in said position PT and for the movement of the vehicle V itself at high speed. Moreover, such suspension means 13 may operate as stabilizer elements of the vehicle V, if necessary (configuration of FIG. 8).

Finally, it should be noted that the vehicle V of the present invention can be advantageously used also for the transportation of the following groups of people:

a) people with priority access to the airplane (first-class passengers, on-boarding directly from the First Class Lounge to the airplane, VIP passengers to ensure discretion) to ensure maximum comfort, service and utmost privacy.

b) Airplane crew: particularly useful for Cargo airplanes.

c) People in general: the present invention can also be extended in terms of size and ability to transport people, so it can actually become an "elevating coach".

Advantages are: 1) comfort (no need to take the stairs, no exposure to rain or, more generally, to bad weather (between coach, airplane or unloading station)), 2) speed (the onboarding process is accelerated), 3) safety (no need to take the stairs).

d) Transportation of cleaning/inspection/maintenance teams: these teams would thus become independent of stairs etc. and would be able to bring all the necessary tools directly to the right level.

e) More generally, the invention will be used wherever people are needed to be transported safely and quickly, for distances up to a few kilometres, where the operations of loading and unloading of people occur at different height levels (from 0 up to 10 metres).

The invention claimed is:

1. A motorized vehicle (V) for transportation of people or goods comprising frame means (T) for supporting a housing cabin (C) for the people or goods and suitable to be elevated by means of lifting means (S, M) of the cabin (C) for moving the cabin (C) between a loading/unloading position (PT) of said people at ground level and a loading/unloading position (PEA) of said people at an elevated level; characterized in that the lifting means (S, M) comprise column means (M) defined by cylindrical movement means (7) inserted into each other and suitable to slide through dynamic actuating means (8, 9) arranged coupled to the movement means (7); said column means (M) supporting wheel means (12) for moving the vehicle and suspension means (13) connected to the wheel means (12).

2. The motorized vehicle according to claim 1, characterized in that the actuating means (8, 9) are arranged internally to the cylindrical means (7).

3. The motorized vehicle according to claim 1, characterized in that the actuating means (8, 9) are arranged externally to the cylindrical means (7).

4. The motorized vehicle according to claim 1, characterized in that the actuating means (8, 9) are of double-stem.

5. The motorized vehicle according to claim 1, characterized in that the frame (T) supports at least three of the column means (M).

6. The motorized vehicle according to claim 5, characterized in that at least two of said column means (M) are arranged at a front portion of the frame (T) of the vehicle (V).

7. The motorized vehicle according to claim 1, characterized in that the wheel means (12) comprise movement wheels (12) with steering axle; at least one of said wheels (12) being a driving wheel.

8. The motorized vehicle according to claim 1, characterized in that the frame (T) is a frame T of metal tubes suitable to support, in a supporting manner, substantially embedded in its inside, the cabin (C).

* * * * *